United States Patent
Matsuo

(10) Patent No.: US 6,473,110 B1
(45) Date of Patent: Oct. 29, 2002

(54) IMAGE RECORDING APPARATUS SIMULTANEOUSLY RECORDING A PLURALITY OF LINE IMAGES WITH A PLURALITY OF LIGHT BEAMS

(75) Inventor: Toshihisa Matsuo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/429,009

(22) Filed: Oct. 28, 1999

(30) Foreign Application Priority Data

Oct. 30, 1998  (JP) .......................................... 10-309295

(51) Int. Cl.⁷ ............................................... B41J 2/435
(52) U.S. Cl. ...................................... 347/235; 347/250
(58) Field of Search .............................. 347/132, 233, 347/235, 237, 239, 247, 249, 250; 250/559.3; 358/481

(56) References Cited

U.S. PATENT DOCUMENTS

| | | | | |
|---|---|---|---|---|
| 4,393,387 A | | 7/1983 | Kitamura | 347/240 |
| 4,404,571 A | * | 9/1983 | Kitamura | 347/235 |
| 5,821,978 A | * | 10/1998 | Yamamoto et al. | 347/235 |
| 5,995,246 A | * | 11/1999 | Komiya et al. | 358/481 |

FOREIGN PATENT DOCUMENTS

| | | | | |
|---|---|---|---|---|
| JP | 57-39669 | * | 3/1982 | H04N/1/36 |
| JP | A60-153259 | | 8/1985 | |
| JP | A9-1859 | | 1/1997 | |

* cited by examiner

*Primary Examiner*—Hai Pham
(74) *Attorney, Agent, or Firm*—Birch, Stewart, Kolasch & Birch, LLP

(57) ABSTRACT

An image recording apparatus includes a reference clock signal generating unit which generates a reference clock signal; a light beam generating unit which generates a plurality of light beams; a beam detect sensor which detects the plurality of generated light beams to output a plurality of light beam detection signals; an image clock signal. generating unit responding to the reference clock signal and the plurality of light beam detection signals to successively generate a plurality of image clock signals. These clock signals have the same period, and correspond to the plurality of light beam detection signals. Additionally, included is a modulating unit responsive to the plurality of image clock signals to modulate the generated plurality of light beams based on the plurality of image data; a driving circuit which drives the light beam generating unit based on the plurality of modulated light beams; a light beam scanning unit which performs a period scan on a photoreceptor with the plurality of generated light beams; and an image recording unit that records an image based on the plurality of light beams used to scan the photoreceptor.

5 Claims, 9 Drawing Sheets

IMAGE RECORDING APPARATUS SIMULTANEOUSLY RECORDING A PLURALITY OF LINE IMAGES WITH A PLURALITY OF LIGHT BEAMS

BACKGROUND OF THE INVENTION

1. Field of the Invention

The present invention relates to an image recording apparatus which records and reproduces an image by performing a scan on a photoreceptor with a light beam which is modulated based on an image signal. More specifically, the present invention relates to an image recording apparatus which simultaneously records a plurality of line images by scanning and exposing the photoreceptor with a plurality of laser beams.

2. Description of the Background Art

In the market of image recording apparatuses such as a laser printer having a laser recording apparatus or a digital copying machine, the conventional machines which have been introduced into the market range from the low-cost and low-speed machines to the high-cost and high-speed machines. In the market of image recording apparatuses operating at high recording speed, all high-level functions which are not only high-speed output but high image quality are required relative to all specifications.

Regarding the laser recording apparatus, the high-speed output could be achieved by increasing the number of revolutions of a photoreceptor and enhancing the scanning speed of a laser scanning device so as to record an image on the photoreceptor rotating at high speed.

In order to enhance the scanning speed of the laser scanning device, a rotational polygon mirror should be rotated at high speed for scanning with the laser beam in a predetermined direction (main scanning direction).

However, if the method of enhancing the speed of rotational polygon mirror is employed, a motor for the rotational polygon mirror inevitably increases in size, so that a problem of radiating heat from the motor arises. At present, the size of the entire apparatus and the space where the apparatus is to be installed should be considered, and the problems such as the noise due to enhanced speed and increase in weight of the apparatus have arisen. Therefore, the extent of enlargement of the motor is limited.

In the high speed laser recording apparatuses of today, the enhancement of the speed is achieved by not only speeding up the rotation of the rotational polygon mirror but simultaneously recording a plurality of line images by one scanning operation with a plurality of laser beams.

However, when a plurality of laser beams are used to simultaneously record a plurality of line images, the points at which a scan is started on the plurality of line images on the photoreceptor could deviate from each other (jitter) in the main scanning direction. This is due to displacement of positions where a plurality of laser sources are arranged in parallel with each other.

A method is now known for recording and reproducing an image with high resolution by inclining a plurality of laser sources and arranging them in parallel with each other, so as to decrease the pitch of the line images in the sub-scanning direction and accordingly achieve continuous gradations. In this case, the plurality of inclined laser sources start scan at points deviated from each other in the main-scanning direction.

When the positions where the exposure and scan are started by the laser beams are thus slightly displaced on the photoreceptor (the scan starting points are not aligned in the main-scanning direction), it is impossible to achieve fine gradations of an image which is recorded and reproduced.

A method is accordingly devised for aligning the scan starting points in the sub-scanning direction on the photoreceptor, with which each laser beam is detected before starting the exposure and scan of the photoreceptor, and after a predetermined time set for each laser source has passed (after counting reference clock a predetermined number of times), each laser source is driven (turned on) with modulation based on image data.

In order to implement this method, conventionally a plurality of image clock signals having different phases are generated in advance, and an image clock signal which satisfies a predetermined condition is determined when each laser beam is detected before starting exposure and scan of the photoreceptor. The laser source is then driven with modulation by the determined image clock signal.

The structure mentioned above is disclosed in U.S. Pat. No. 4,393,387 and Japanese Patent Laying-Open Nos. 60-153259 and 9-1859.

U.S. Pat. No. 4,393,387 discloses a recording apparatus capable of correctly matching image writing starting positions with a simple structure by inclining a plurality of laser beams and synchronizing a plurality of clock signals that correspond to respective beams based on the result of detection by a beam detector.

Specifically, a plurality of laser beams are inclined, and one position signal is generated based on the result of detection by the detector which detects a particular beam which is turned on. Based on the position signal, a plurality of clock signals having the same period and different phases are produced. The plurality of clock signals are applied to a plurality of memories which store recording signals, and recording signals corresponding to respective beams are read out.

Japanese Patent Laying-Open No. 60-153259 discloses a synchronizing device of a laser printer capable of decreasing the jitter by providing a clock delay unit which successively delays reference clocks with a constant phase and selecting one of thus produced clocks as an image clock which maintains a constant relation with an output of a photodetector.

Specifically, when laser beam reaches the photodetector, a photo-detection output pulse HS is output. The photo-detection output pulse HS is supplied to a latch circuit, and a combination of a plurality of clocks T0 and T1 is supplied to a data input of a data selector. After clocks T0 and T1 are respectively delayed by ¼ period to generate pulses T2 and T3, any one of pulses T0 to T3 is selected. Pulse data supplied to select inputs SA and SB of the data selector are synchronized by the photo-detection output pulse HS. Therefore, the pulse data selected by the data selector and output from an output terminal Y is substantially synchronous with pulse HS. The output is accordingly used as an image clock so as to implement image recording with reduced jitter.

Japanese Patent Laying-Open No. 9-1859 discloses an image forming apparatus capable of synchronizing a synchronizing signal with an image clock precisely without using a high-frequency reference clock and without using a number of clocks having different phases, by utilizing an analog periodic signal.

Specifically, a synchronizing signal indicating a starting timing of image formation is generated for each line in the main-scanning direction. According to the timing at which the synchronizing signal is generated, the voltage value of the analog periodic signal with periodically changing voltage value is sampled and held. Thus, the timing at which the synchronizing signal is generated relative to a reference clock signal is converted to the voltage value to be stored. Comparison between the analog periodic signal and the stored voltage value allows a pixel clock to be produced with a phase corresponding to the timing at which the synchronizing signal is generated.

According to the methods disclosed in U.S. Pat. No. 4,393,387 and Japanese Patent Laying-Open No. 60-153259, however, a plurality of image clock signals having different phases respectively should be generated in advance. In order to minimize the displacement in the recording starting position in the main-scanning direction, the phases of the image clock signals should be displaced finely from each other so as to generate a large number of image clock signals. As a result, the number of delay circuits for displacing the phases increases, leading to a complicated circuit structure.

Consequently, the clock frequency of a plurality of image clock signals increases, making it difficult to implement the circuit, or may cause problems such as high-frequency noise and increase in cost due to employment of a high-speed element.

Further, the delay circuits used for generating a large number of clocks that are different from each other in delay time could not ensure a stable delay amount in the event temperature or voltage varies.

Even if a plurality of image clock signals having different phases are generated, it cannot be guaranteed that an image clock is obtained which satisfies a predetermined condition when a laser beam is detected before start of exposure and scan of the photoreceptor. Therefore, there arises a problem in eliminating the displacement of positions where exposure is started by a plurality of laser sources.

In the case of the art disclosed in Japanese Patent Laying-Open No. 9-1859 which employs the analog periodic signal, a sample-hold circuit and differentiator circuit are required, leading to an increase in throughput of the circuit and difficulty in realizing short-time processing. In particular, if the circuit uses a capacitor, the accuracy of the element is generally inferior to other elements causing a significant unevenness of products. As a result, available products must be selected and accordingly, cost is increased.

In addition, the, analog periodic signal is used as a reference signal. Therefore, influence by variation of the power supply or unevenness of elements causes a sawtooth waveform. Compared with a digital signal, the analog periodic signal is liable to cause disadvantages such as unevenness of image clocks and variation in the scan starting position.

SUMMARY OF THE INVENTION

The present invention is envisioned to solve the above-noted problems . One object of the present invention is to closely reproduce, using a simple structure, variation in intensity of an image which is recorded on a photoreceptor so as to obtain an even image with superior gradations.

Another object of the present invention is to closely reproduce, without difficult positional adjustment, variation in intensity of an image which is recorded on a photoreceptor so as to obtain an even image with superior gradations.

According to one aspect of the invention, an image recording apparatus includes: a reference clock signal generating unit which generates a reference clock signal; a light beam generating unit which generates a plurality of light beams detection signals corresponding to the plurality of light beams respectively; an image clock signal generating unit and the beam detect sensor and responds to the reference clock signal and the plurality of light beam detection signals to successively generate a plurality of image clock signals of the same period corresponding respectively to the plurality of light beam detection signals; a modulating unit which is connected to the image clock signal generating unit and which responds to the plurality of image clock signals respectively to modulate the plurality of light beams generated by the light beam generating unit based on a plurality of image data respectively; a driving circuit which is connected to the light beam generating unit and the modulating unit and drives the light beam generating unit based on the plurality of modulated light beams; a light beam scanning unit which performs periodic scan on a photoreceptor with the plurality of light beams generated by the light beam generating unit; and an image recording unit which records an image based on the plurality of light beams with which the scan is performed on the photoreceptor.

When a plurality of light beams are detected by the beam detect sensor, the image clock signal generating unit produces image clock signals each having the same period each after the same time has passed for each of light beam detection signals. In response to the image clock signals, light beams are modulated and the modulated light beams are generated by the light beam generating unit. In this way, the scan starting positions on the photoreceptor with the light beams generated by the light beam generating unit match each other, thus deviation between a plurality of lines of an image can be reduced. With a simple structure, variation in intensity of the image recorded on the photoreceptor can closely be reproduced, and an even image with excellent gradations can be obtained.

Preferably, the reference clock signal generating unit is a single reference clock signal generating unit.

The image clock signal generating unit successively generates a plurality of image clock signals based on a single reference clock signal.

Therefore, even if the image clock signals are produced by image clock signal generating units, the image clock signals can be produced under the same condition. Deviation between a plurality of image lines can thus be reduced. In this way, variation in intensity of an image recorded on the photoreceptor can closely be reproduced and thus an even image having excellent gradations can be obtained.

Still preferably, the beam detect sensor outputs a plurality of light beam detection signals individually.

A plurality of light beam detection signals can be obtained from one beam detect sensor without using a plurality of light beam detect sensors. Positional adjustment as required when a plurality of beam detect sensors are used is unnecessary. A plurality of precise light beam detection signals can thus be obtained and deviation between a plurality of image lines can be decreased. Consequently, variation in intensity of an image recorded on the photoreceptor can closely be reproduced and thus an even image with excellent gradations can be obtained.

Still preferably, the light beam generating unit includes a plurality of light emitting sections.

The positions of the plurality of light emitting sections are displaced from each other in order to prevent a plurality of light beams from simultaneously entering the beam detect sensor. In this way, a plurality of light beams can be detected by one beam detect sensor.

Still preferably, the modulating unit outputs, after counting the plurality of image clock signals respectively a predetermined number of times, the plurality of modulated light beams.

The modulated light beam is output after the image clock signal is counted a predetermined number of times. During this period, the light beam can reach the image scan starting position on the photoreceptor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
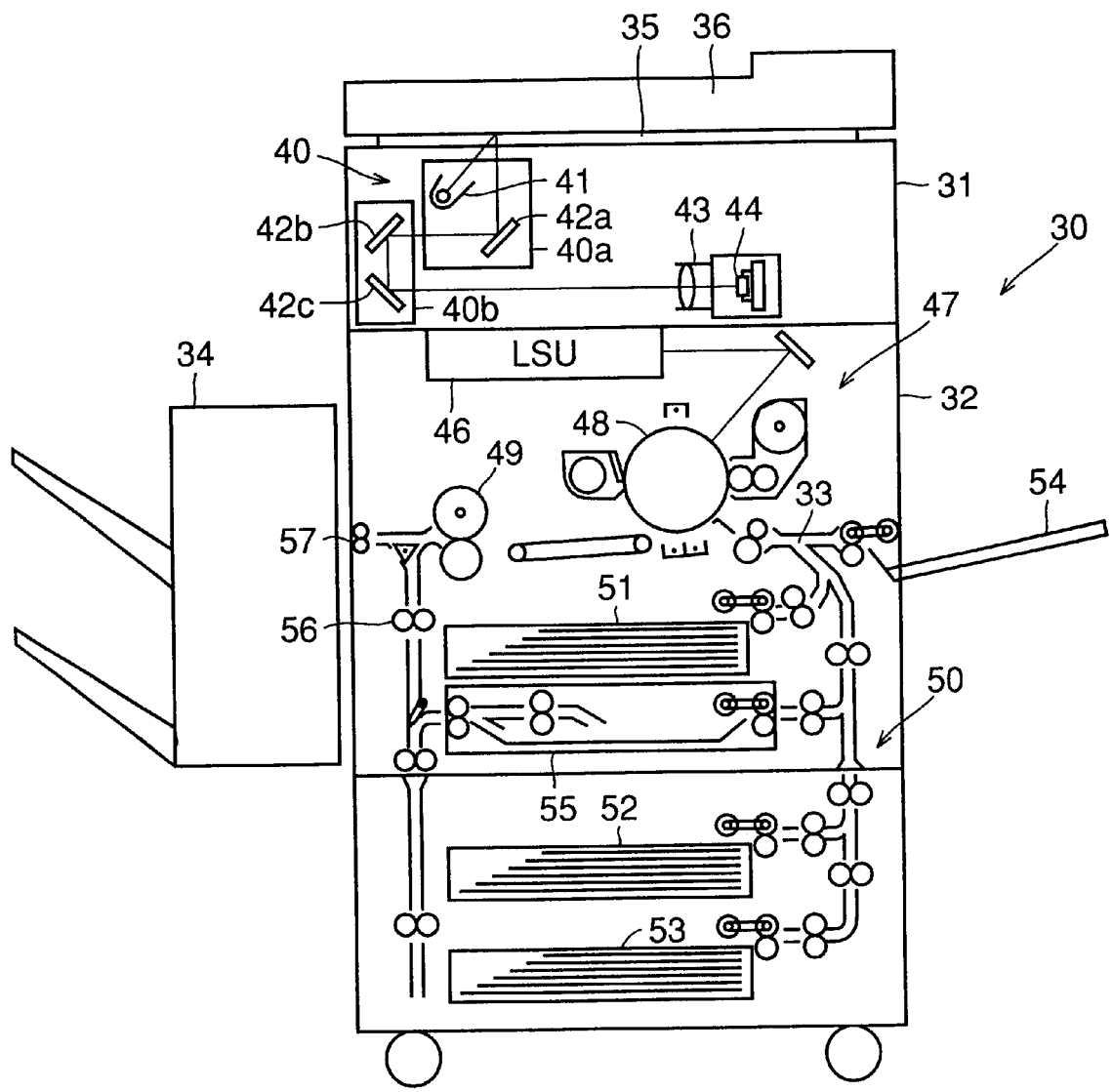
FIG. 1 is a cross sectional view of a digital copying machine according to one embodiment of the present invention.

Referring to FIG. 1, a digital copying machine 30 in one embodiment of the present invention includes a scanner portion 31 and a laser recording portion 32.

Laser recording portion 32 includes an image recording unit (upper stage) which records and reproduces an image on a recording medium supplied from a paper feeding tray unit (described hereinafter) and a multistage paper feeding unit (lower stage) which accommodates a large number of different recording media so as to selectively supply recording media of different sizes or the like to the image recording unit.

Scanner portion 31 includes a platen glass 35 formed of a transparent glass, a duplex reversing automatic document feeder (RADF) 36 to automatically transport and supply an original document onto platen glass 35, and an original document image reading unit or scanner unit 40 for scanning and reading an image of the original document placed on platen glass 35.

The image of the original document read by scanner portion 31 is sent to an image data input portion (described hereinafter) as image data, and predetermined image processing is performed for the image data.

RADF 36 automatically supplies a plurality of original documents set on a document tray (not shown) one by one onto platen glass 35.

In order to allow scanner unit 40 to read one side or both sides of an original document depending on selection by an operator, RADF 36 includes a transport path for a single-sided original document, a transport path for a double-sided original document, a transport path switching device, a group of sensors controlling the state of an original document which passes through each component, a control unit and the like.

There are plenty of patent applications with respect to RADF 36 and it has been variously commercialized already, therefore, further detailed description thereof is not presented here.

Scanner unit 40 as a component of scanner portion 31 for reading an image of a document on platen glass 35 includes a lamp reflector assembly 41 which exposes the surface of an original document to light, a first scanning unit 40a having a first reflection mirror 42a which reflects light from the original document so as to direct the image of the reflected light from the original document to a charge coupled device (CCD) 44, a second scanning unit 40b having second and third reflection mirrors 42b and 42c for directing the image of reflected light from the first reflection mirror 42a to CCD 44, an optical lens 43 for forming the image of the reflected light on CCD 44 that is from the original document via each reflection mirror, and CCD 44 which converts the image of reflected light from the original document to an electrical image signal.

Scanner portion 31 is structured such that cooperative operations of RADF 36 and scanner unit 40 allow original documents to be read to be placed successively on platen glass 35 and allow scanner unit 40 to move along the lower surface of platen glass 35 in order to read an image of an original document.

The first scanning unit 40a is controlled such that it performs a scan from left to right along platen glass 35 at a constant speed V. The second scanning unit 40b is controlled such that it performs a scan in the same direction in parallel at half the speed V, i.e. V/2. In this way, the image of the original document placed on platen glass 35 is formed line by line successively on CCD 44 and thus one image is read.

The image data obtained by reading the image of the original document by scanner unit 40 is supplied to an image processing portion (described hereinafter), undergoes various processes, and is thereafter stored temporarily in a memory of the image processing portion. In accordance with an output instruction, an image in the memory is read and transferred to laser recording portion 32 to be recorded and reproduced as an image on a recording sheet P.

Laser recording portion 32 includes a recording medium supply unit 50 which accommodates recording media size by size on which an image is to be recorded and successively supplies a selected recording medium, a transport system for sheets which are recording media on which an image is to be formed, a laser scanning unit (LSU) 46, and an electrophotograph processing unit 47 for forming an image.

Laser scanning unit 46 includes a semiconductor laser source which emits a laser beam according to image data read from the memory or to image data supplied from any external device, a polygon mirror which deflects the laser beam at the same angular speed, an f-θ lens which corrects the laser beam deflected at the same angular speed such that it is deflected at the same angular speed on a photoreceptor drum 48 which is a component of electro-photograph processing unit 47, and the like.

Electro-photograph processing unit 47 includes a charging unit, a developing unit, a transferring unit, a separating unit, a cleaning unit and a discharging unit that are located around well-known photoreceptor drum 48.

Recording medium supply unit 50 and the sheet transport system include a supply and transport unit 33 which transports sheet P to electro-photograph processing unit 47 for implementing the image formation, especially to the transfer position where the transferring unit is placed, paper feeding tray units 51, 52 and 53 for selectively supplying sheet P successively to supply and transport unit 33, a manual paper feeding unit 54 for allowing an operator to appropriately supply a sheet of necessary size, a fixing unit 49 for fixing an image formed on sheet P after the transfer process, especially a toner image, a re-supply and transport path 56 for supplying sheet P again so as to form an image again on the rear side of sheet P after the fixing process, and a re-supply unit 55 for supplying sheet P which is sent through re-supply path 56 again to the image recording unit.

On the left side of the apparatus and on the downstream side of fixing unit 49, a post-processing unit 34 is placed which receives sheet P With an image recorded thereon so as to perform a predetermined process for sheet P.

Digital copying machine 30 having the structure as described above reads an image of an original document at scanner portion 31 and stores it as image data in the image memory. On the other hand, laser scanning unit 46 successively reads the image data from the image memory, while performing scan with laser beam, and electro-photograph processing unit 47 forms an electrostatic latent image on the surface of photoreceptor drum 48. The visualized toner image is electrostatically transferred onto and fixed on sheet P which is transported from any section of the multi-stage paper feeding unit.

If an image is to be formed again on the rear side of sheet P having thus produced image, sheet P is directed to electro-photograph processing unit 47 through re-supply and transport unit and path 55 and 56. If sheet P is directly discharged from the machine, sheet P is directed from fixing unit 49 through a paper discharge roller 57 into post-processing unit 34. Sheet P undergoes predetermined post-processing by post-processing unit 34 as required.

A structure and functions of the image processing portion in digital copying machine 30 are now described that performs image processing for the information on an image of an original document which is read.

FIGS. 2A to 2E are block diagrams illustrating various units, the image processing portion and the like that constitute digital copying machine 30 in FIG. 1. A main central processing unit (CPU) 401 located substantially in the central portion manages operations in cooperation with sub CPUs which are provided to respective units.

Figure 2A:
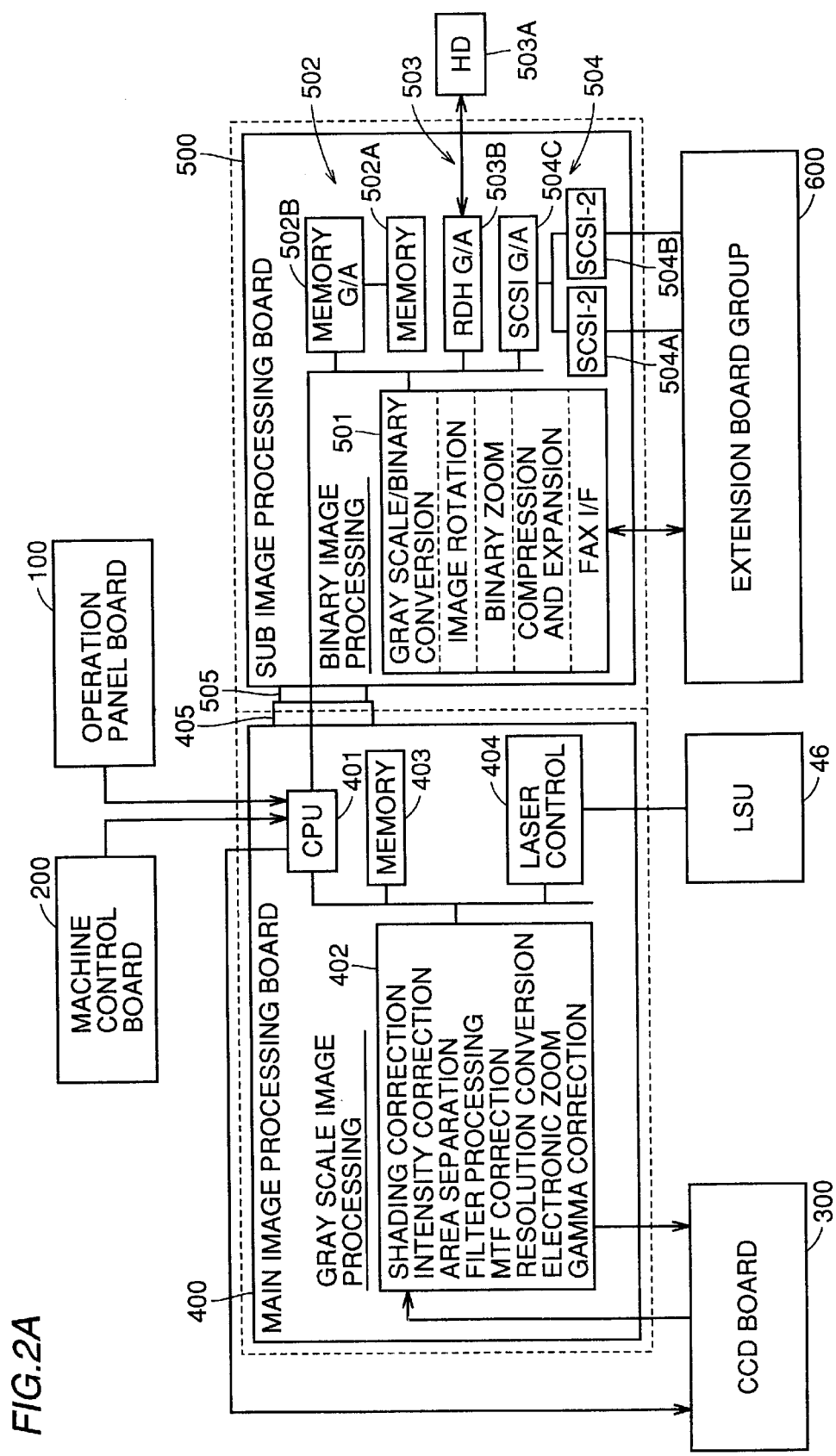
FIG. 2A is a block diagram of the digital copying machine according to the embodiment of the invention.

Referring to FIG. 2A, the various units and the image processing portion which constitute digital copying machine 30 include an operation panel board 100 which manages and controls an operation panel (not shown), a machine control board 200 which manages and controls various units (not shown) which constitute digital copying machine 30, a CCD board 300 which electrically reads an image of an original document and converts it to electronic data, a main image processing board 400 which performs predetermined image processing for the image of the original document converted to the electronic data by CCD board 300, a sub image processing board 500 which performs further image processing for the image information resulting from the processing by main image processing board 400, and a group of other extension boards 600 (printer board, FAX (facsimile) board, function extension board) connected to sub image processing board 500 via an interface.

Details of the management and control are hereinafter described for each board.

Operation Panel Board

Figure 2B:
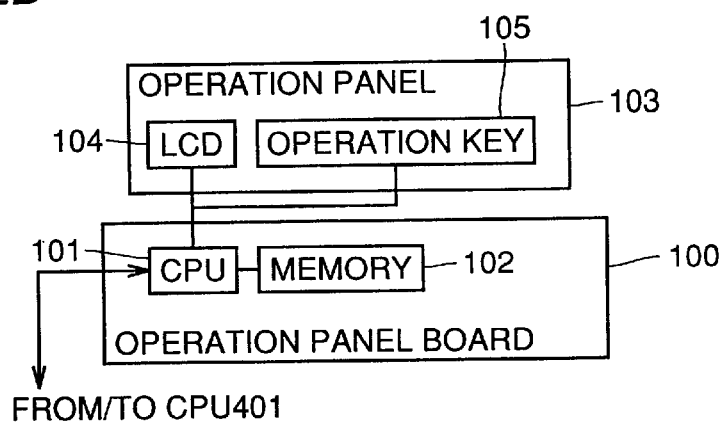
FIG. 2B is a block diagram illustrating a structure of an operation panel board according to the embodiment of the invention.

Referring to FIG. 2B, operation panel board 100 is controlled basically by a sub CPU 101. Operation panel board 100 is connected to an operation panel 103 and manages a display screen of an LCD (Liquid Crystal Display) 104 placed on operation panel 103, and operational inputs by an operation key group 105 through which instructions are given with regard to various modes.

Operation panel board 100 further includes a memory 102 which stores various control information for operation panel 103 such as data supplied through operation key group 105 and information to be displayed on LCD 104.

In this structure, sub CPU 101 communicates control data with main CPU 401 and issues instructions concerning operations of digital copying machine 30.

Main CPU 401 transfers a control signal indicating an operation status of digital copying machine 30 to sub CPU 101. Sub CPU 101 receives the control signal to display the current operation status of digital copying machine 30 on LCD 104 of operation panel 103.

Machine Control Board

Figure 2C:
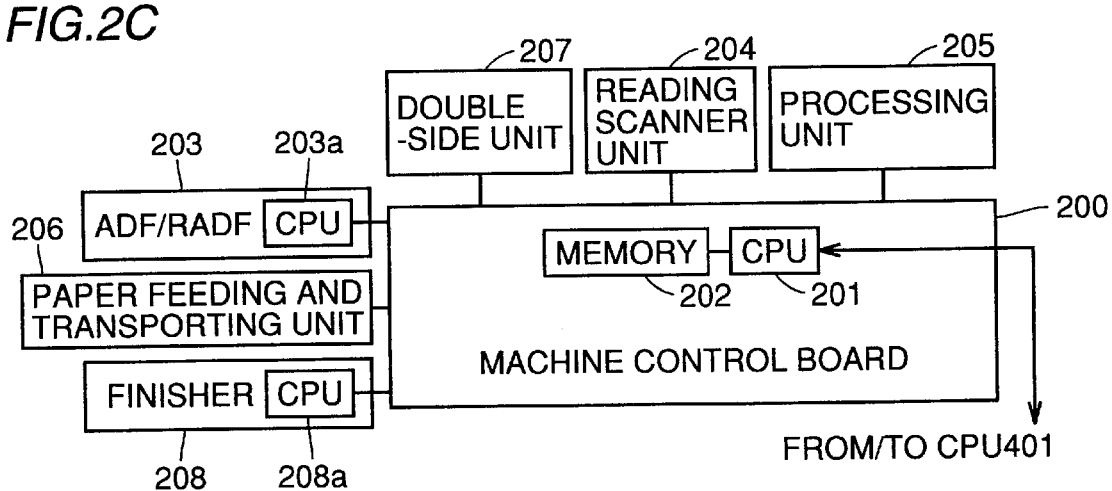
FIG. 2C is a block diagram illustrating a structure of a machine control board according to the embodiment of the invention.

Referring to FIG. 2C, machine control board 200 is controlled entirely by a sub CPU 201. Sub CPU 201 manages an automatic document feeding unit 203 such as the ADF (Automatic Document Feeder) and RADF, a reading scanner unit 204 which reads an image of an original document, a processing unit 205 which reproduces image information as an image, a paper feeding and transporting unit 206 which successively transports sheets on which an image is to be recorded from a housing section to the processing unit, a double-side unit 207 which reverses a sheet having an image recorded thereon and transports it such that images are formed on both sides of the sheet, a finisher 208 which performs post-processing such as stapling for a sheet on which an image is recorded, and the like.

CCD Board

Figure 2D:
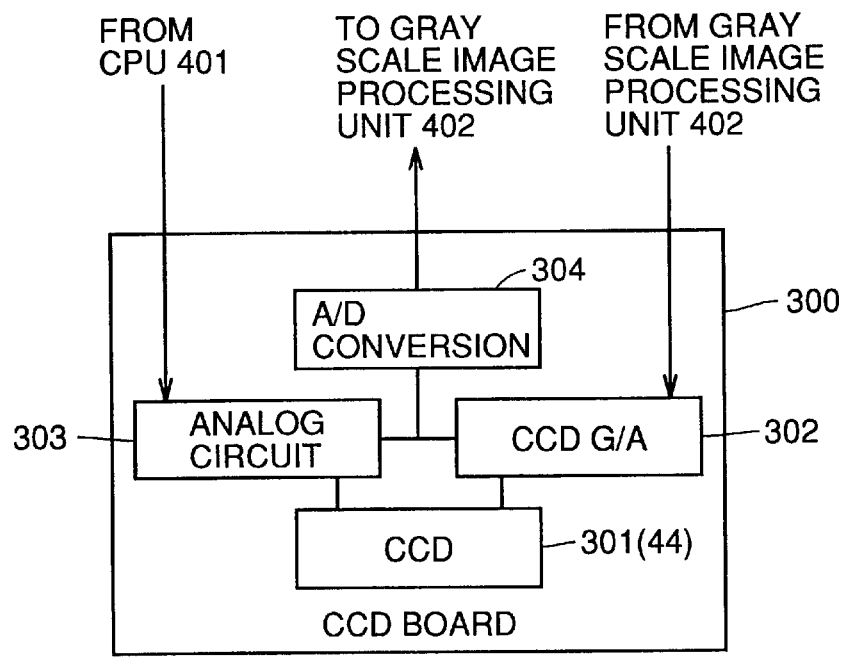
FIG. 2D is a block diagram illustrating a structure of a CCD board according to the embodiment of the invention.

Referring to FIG. 2D, CCD board 300 includes a CCD 301 for electrically reading an image of an original document, a CCD gate array 302 which drives CCD 301, an analog circuit 303 which adjusts the gain of analog data supplied from CCD 301, and an A/D (Analog to Digital) converter 304 which converts the analog output of CCD 301 to a digital signal and supplies it as electronic data. Control and management are conducted by main CPU 401.

Main Image Processing Board

Referring again to FIG. 2A, main image processing board 400 includes a gray scale image processing unit 402 which is controlled by main CPU 401 to carry out shading correction, intensity correction, area separation, filter processing, MTF (Modulation Transfer Function) correction, resolution conversion, electronic zoom (variable power processing), gamma correction, and the like for gray scale image data as it is, based on the electronic data of the original document image sent from CCD board 300 such that desired gradations are represented in a desired condition, a memory 403 which stores the processed image data or various control information such as the management of procedure of the processes, and a laser control 404 which controls transfer of data to laser scanning unit 46 so as to reproduce an image using the processed image information.

Sub Image Processing Board

Sub image processing board 500 includes a binary image processing unit 501 joined by connectors with main image processing board 400 and controlled by main CPU 401 on main image processing board 400, a memory 502A which stores information on the image-processed binary image or information on control of processes, a gate array 502B which controls memory 502A, a hard disk 503A which stores and manages 15 information on images of a plurality of original documents, a gate array 503B which repeatedly reads from hard disk 503A the plurality of original documents the number of times corresponding to a desired number of copies so as to make a plurality of copies, SCSIs (Small Computer System Interfaces) 504A and 504B that are external interfaces, and a gate array 504C which controls the SCSIs.

Binary image processing unit 501 includes a processing unit which converts gray scale image information to binary image, a processing unit which rotates an image, a binary variable power processing (zoom) unit which performs variable power processing of a binary image, and a facsimile interface which sends and receives a facsimile image via communication means.

Extension Board Group

Figure 2E:
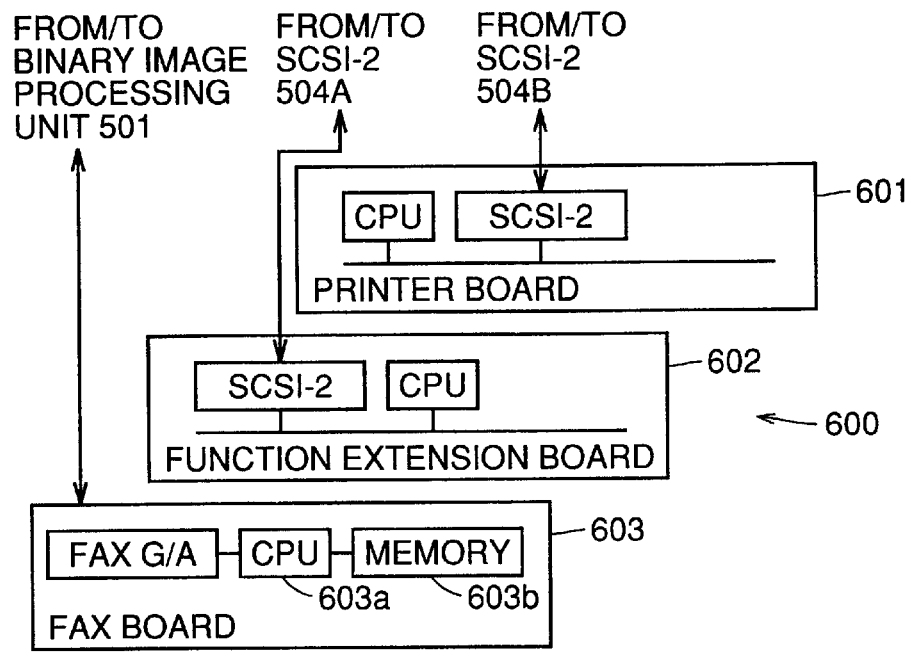
FIG. 2E is a block diagram illustrating a structure of an extension board group according to the embodiment of the invention.

Referring to FIG. 2E, extension board group 600 includes a printer board 601 to allow data sent from a personal computer or the like in a printer mode to be output from a printer portion of the digital copying machine, a function extension board 602 which extends the edit function of the digital copying machine so as to effectively utilize the features of the digital copying machine, and a facsimile board 603 which enables transmission of an original document image read by the scanner unit of the digital copying machine to a receiver and enables output of image information supplied from a sender from the printer portion of the digital copying machine.

Image data processing and flow of image data in copy, facsimile and printer modes in the digital copying machine are hereinafter described further in detail.

Copy Mode

Original documents set at a predetermined position of RADF 36 of digital copying machine 30 are supplied successively one by one onto platen glass 35 of scanner unit 40. Images of the original documents are successively read by scanner unit 40 having the structure as described above and transferred as electronic data of 8-bit to main image processing board 400.

The 8-bit electronic data transferred to main image processing board 400 undergoes predetermined processing as 8-bit electronic image data at gray scale image processing unit 402. Image processing unit 402 conducts processing such as gamma correction for the 8-bit electronic image data, and transmits the processed electronic image data to laser scanning unit 46 via laser control unit 404.

Accordingly, the original document image read by scanner portion 31 of digital copying machine 30 is output as a copy image having gradations from laser recording portion 32.

Electronic RDH (Recirculate Document Handler) in Copy Mode

Original documents set at a predetermined position of RADF 36 of digital copying machine 30 are similarly supplied successively onto platen glass 35 of scanner unit 40 one by one. Images of the original documents are successively read by scanner unit 40 having above-described structure and transferred to main image processing board 400 as 8-bit electronic data.

The 8-bit electronic data transferred to main image processing board 400 undergoes predetermined processing as 8-bit electronic image data on gray scale image processing unit 402. The 8-bit electronic image data is then supplied to sub image processing board 500 from a connector 405 of then supplied to sub image processing board 500 from a connector 405 of main image processing board 400 via a connector 505 of sub image processing board 500. A gray scale/binary converting unit of binary image processing unit 501 converts the 8-bit electronic image data to 1-bit electronic image data by error dispersion process or the like. The resultant 1-bit electronic image data corresponding to respective original documents are transferred one by one to hard disk 503A and temporarily stored to be managed therein.

The process such as the error dispersion is used to convert the 8-bit electronic image data to the 1-bit electronic image data so as to avoid deterioration of an image quality, which is caused if the gray scale/binary conversion is just carried out. The 8-bit electronic image data is converted to the 1-bit electronic image data taking into consideration the storage capacity of an image and the like.

After all the documents set at RADF 36 of digital copying machine 30 are read and processed, the 1-bit electronic image data temporarily stored in hard disk 503A is repeatedly read the number of times corresponding to the number of copies designated by control of the gate array. The read 1-bit electronic image data is sent again to main image processing board 400 via connectors 405 and 505. Main image processing board 400 performs processing such as gamma correction for 2-bit electronic image data and transmits it to laser scanning unit 46 via laser control unit 404. Laser recording portion 32 outputs the original document image read by scanner portion 31 of digital copying machine 30 as a copy image having gradations.

According to the description above, although the images are repeatedly read the number of times corresponding to a desired number of copies after all images of the documents are read, it is possible to output images of the first copy when a predetermined number of images are prepared, and successively output images of the second and following copies.

Printer Mode

Printer board 601 extends an image supplied from any external equipment connected in a network such as a personal computer as an image corresponding to each page (page image). Printer board 601 transfers the page image from SCSI 504B as an interface to sub image processing board 500. The transferred page image is stored in hard disk 503A.

It is noted that sub image processing board 500 does not perform binary image processing for the page image and just temporarily stores it in hard disk 503A. In addition, sub image processing board 500 does not conduct the binary image processing when the temporarily stored page image is read from hard disk 503A.

The image information which is temporarily stored in hard disk 503A is transmitted to main image processing board 400 while it is read from hard disk 503A such that the information is arranged in a predetermined order of pages. Gray scale image processing unit 402 makes gamma correction of the image information. Laser control 404 controls writing of an image such that an image is reproduced by laser scanning unit 46.

Facsimile Mode

Facsimile mode includes transmission of an original document to a receiver and reception of an original document from a sender.

Transmission of an original document to a receiver is described first. Original documents to be sent which are set at a predetermined position of RADF 36 of digital copying machine 30 are successively fed onto platen glass 35 of scanner unit 40 one by one. Images of the documents to be sent are successively read by scanner unit 40 having the above-described structure. The read images are transferred to main image processing board 400 as 8-bit electronic data.

Gray scale image processing unit 402 performs predetermined processing for the 8-bit electronic data which is transferred to main image processing board 400 by regarding it as 8-bit electronic image data.

The 8-bit electronic image data is then sent to sub image processing board 500 from connector 405 of main image processing board 400 to sub image processing board 500 via connector 505 of sub image processing board 500. The gray scale/binary converting unit of binary image processing unit 501 performs processing such as error dispersion for the 8-bit electronic image data to convert it to 1-bit electronic image data. The original document thus converted to the binary image is compressed in a predetermined form and stored in memory 502.

The process such as the error dispersion is used to convert the 8-bit electronic image data to the 1-bit electronic image data so as to avoid deterioration of image quality, which is caused if the gray scale/binary conversion is just carried out.

Gate array 504C makes preparations for transmission to a receiver, and transfers to facsimile board 603 the original document image to be sent that is compressed in a predetermined form and read from memory 502 when transmission becomes ready. Facsimile board 603 performs necessary processing such as change of compression form for the original document image to be sent and successively transmits the image to the receiver through a communication line.

Processing of an image of an original document transmitted from a sender is next described.

When an original document is transmitted from the sender through the communication line, facsimile board 603 receives the original document image transmitted from the sender while manipulating communication. Further, facsimile board 603 transmits the received image compressed in a predetermined form to binary image processing unit 501 from a facsimile interface provided at binary image processing unit 501 of sub image processing board 500. A compression and expansion processing unit of binary image processing unit 501 reproduces the original document image which is transmitted as a page image.

The original document image reproduced as an image corresponding to page is transferred to main image processing board 400 and undergoes gamma correction. Laser control 404 controls writing of the image such that laser scanning unit 46 reproduces the image.

The flow of an image from input to output of the digital copying machine is as described above. Details of image recording portion 32, laser control 404 and laser scanning unit 46 which are essential features of the present invention are now described below.

Figure 3:
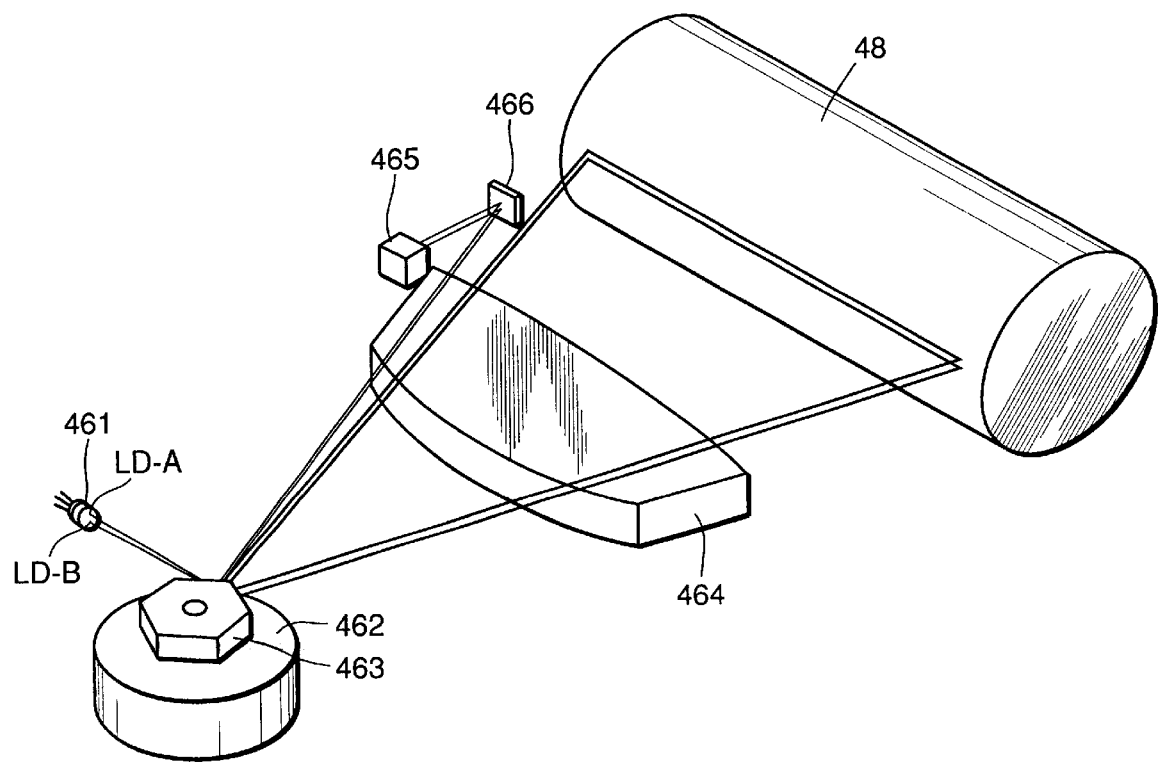
FIG. 3 illustrates a structure of a laser scanning unit of the digital copying machine according to the embodiment of the invention.

Referring to FIG. 3, exposure and scan of photoreceptor drum 48 by laser scanning unit 46 is described. The surface of photoreceptor drum 48 which is driven to rotate in a predetermined direction is scanned in the main scanning direction for exposure thereof with two light beams which are emitted from a semiconductor laser device 461 and deflected by a rotational polygon mirror 463 rotated at a predetermined speed by a rotational driving motor 462.

In order to correct difference in focal length on the photoreceptor drum, there are provided in the optical path between rotational polygon mirror 463 and photoreceptor drum 48, an f-θ lens 464, a beam detect sensor (BD sensor) 465 for adjusting for each line the timing of exposure and scan for recording an image on photoreceptor drum 48, and a light-directing mirror 466 for directing a part of laser beam with which exposure and scan are performed in the main scanning direction to BD sensor 465.

Figure 4:
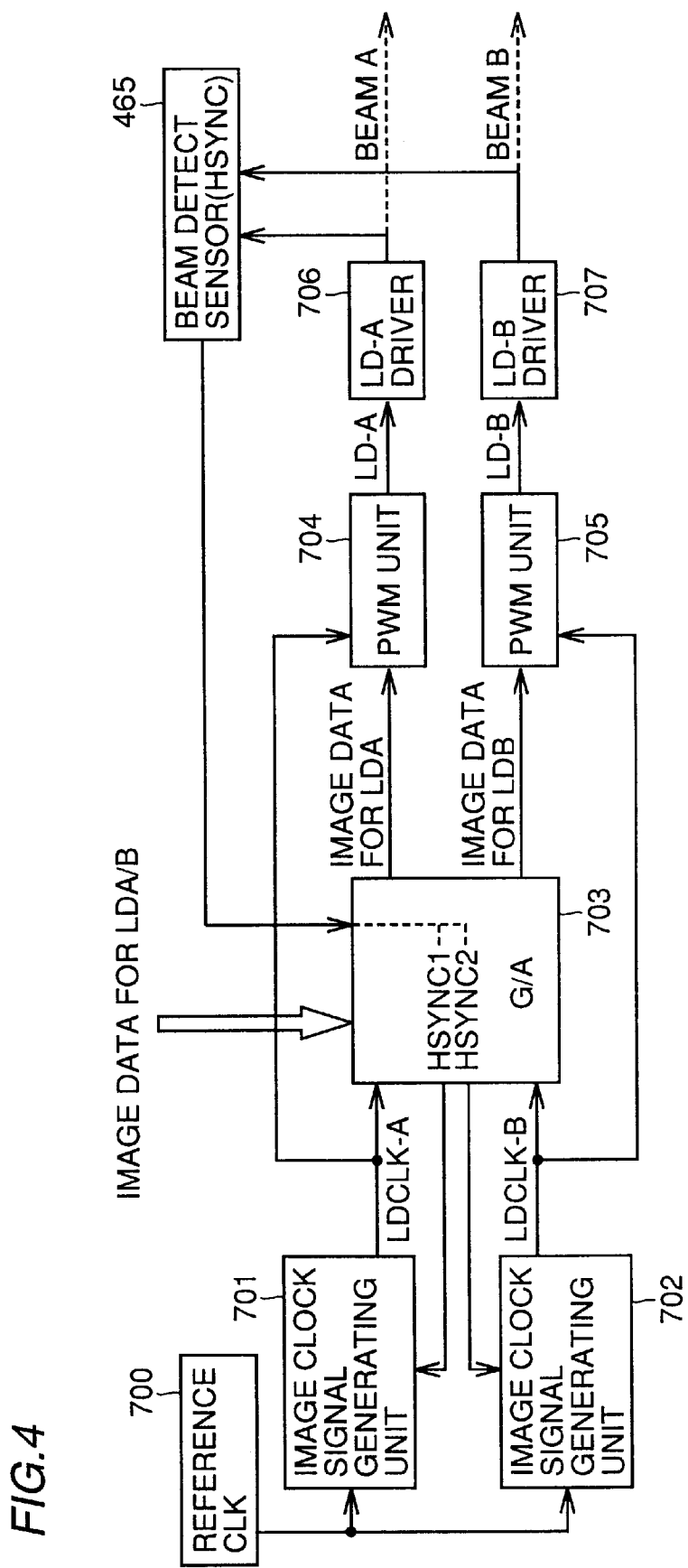
FIG. 4 illustrates a laser driving circuit of the digital copying machine according to the embodiment of the invention.
Figure 5A:
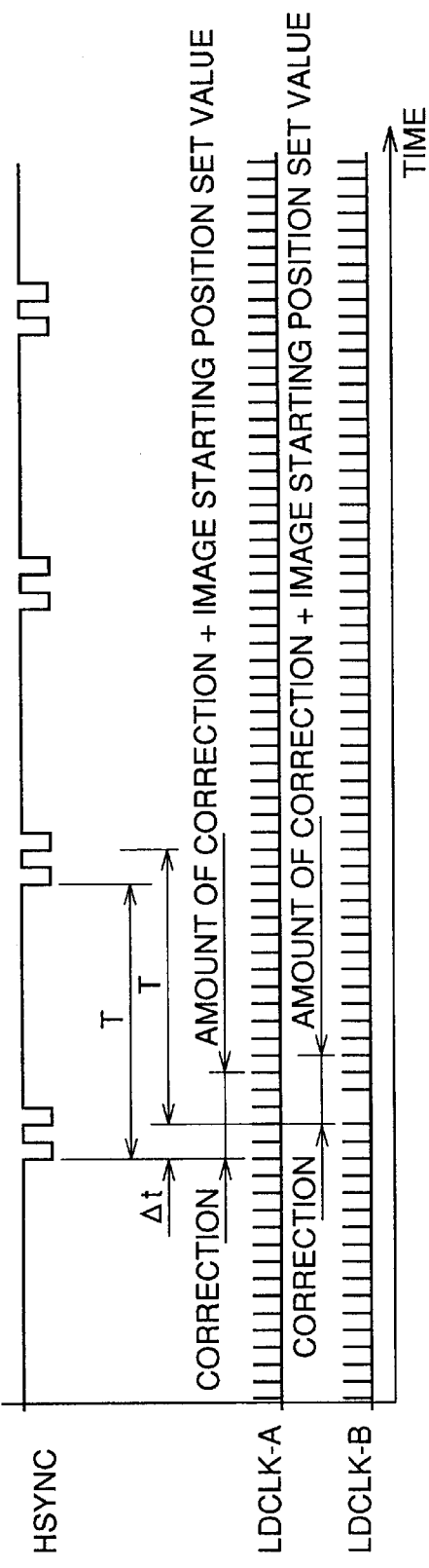
FIG. 5A illustrates a relation between beam detection signal HSYNC and image clock signals LDCLK-A and LDCLK-B and FIG. 5B is a partial enlargement of FIG. 5A illustrating driving signals LD-A and LD-B of drivers 706 and 707.
Figure 5B:
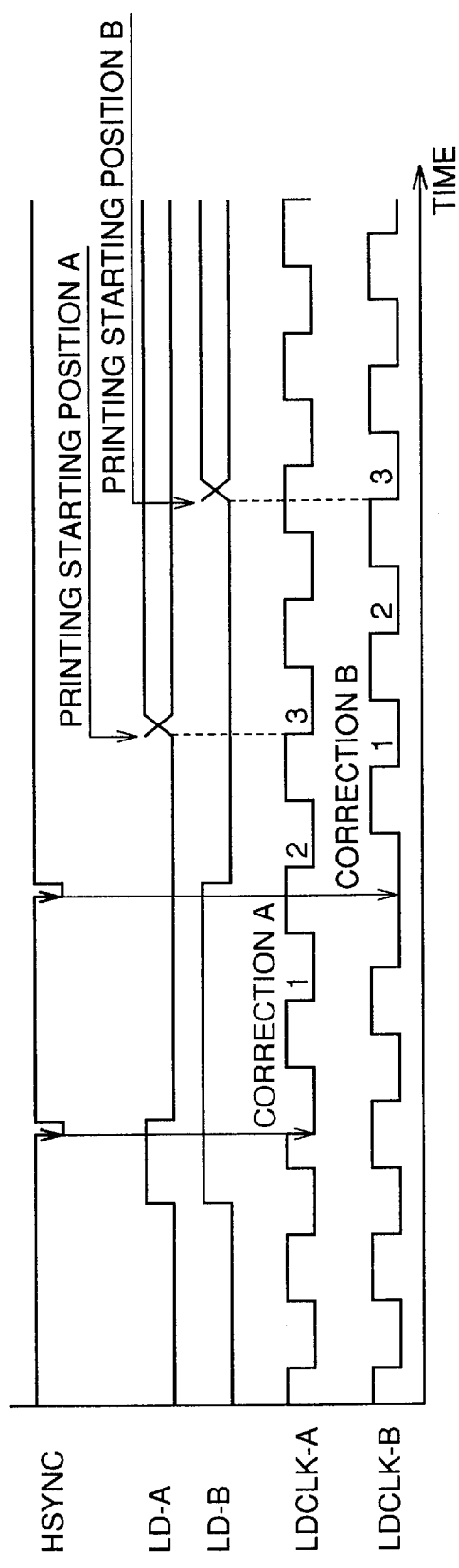

FIG. 4 illustrates a laser driving circuit which performs exposure and scan of an image on photoreceptor drum 48 while driving laser scanning unit 46 shown in FIG. 3. FIGS. 5A and 5B illustrate a driving method for allowing laser beam to be emitted at a predetermined timing from two light emitting sections LD-A and LD-B of semiconductor laser device 461.

Referring to FIG. 4, the laser driving circuit includes a reference clock signal generating unit 700 which generates a reference clock, image clock signal generating units 701 and 702 for correcting deviation of positions on photoreceptor drum 48 (jitter correction) at which scan is started with light beams emitted from two light emitting sections LD-A and LD-B of semiconductor laser device 461, a G/A (Gate Array) 703 constituted of buffer (FIFO, i.e. first-in first-out) and the like which temporarily stores image data transferred from main image processing board 400, PWM (Pulse Width Modulation) units 704 and 705 which modulate laser beams based on the image data, driving circuits (drivers) 706 and 707 which drive two light emitting sections LD-A and LD-B of semiconductor laser device 461, and beam detect sensor 465.

Referring to FIGS. 5A and 5B, the laser driving circuit operates as follows. While rotational polygon mirror 463 of laser scanning unit 46 is rotated at a predetermined rotational speed, LD-A driver 706 and LD-B driver 707 simultaneously turn on the two light emitting sections LD-A and LD-B of semiconductor laser device 461. Beam detect sensor 465 detects respective light beams. Although the number of beam detect sensors 465 may be equal to the number of light beams, only one beam detect sensor 465 which is highest in precision is employed considering reduction of cost, and description is hereinafter given on the case of one beam detect sensor.

If one beam detect sensor 465 is employed, the positions of respective light emitting sections are intentionally displaced from each other in order to prevent two light beams from simultaneously entering. Beam detection signals (HSYNC) of respective two beams detected by beam detect sensor 465 are controlled at G/A (gate array) 703 such that a first beam detection signal (HSYNC1) is input to image clock signal generating unit 701 and a second beam detection signal (HSYNC2) is input to image clock signal generating unit 702. The same reference clock signal generated by reference clock signal generating unit 700 is supplied to image clock signal generating units 701 and 702.

A general-purpose IC (Integrated Circuit) (clock generator) which can output the reference clock signal in synchronization with an externally supplied arbitrary trigger input signal may be applied to image clock signal generating units 701 and 702.

Image clock signal generating units 701 and 702 can respectively generate image clock signals at predetermined starting points that have the same period in synchronization with respective beam detection signals (HSYNC1 and HSYNC2) (see correction points A and B in FIG. 5B).

After PWM units 704 and 705 count the image clocks a certain number for the times corresponding to the time required of light beam to reach an image scan starting position on photoreceptor drum 48 (printing starting positions A and B after counting of 3 clocks in FIG. 5B), line images are scanned while drivers 706 and 707 drive two light emitting sections LD-A and LD-B of semiconductor laser device 461 with modulation based on line image data which is temporarily stored in buffer 703.

It is noted that image clock signal generating units 701 and 702 have the same characteristics and have circuit configurations to allow image clock signals of the same period to be generated, based on the reference clock signal generated by reference clock signal generating unit 700 and the beam detection signals, at the same timing originating at the same starting point.

Using the simple structure, the positions can accordingly be matched where dot images are written on the surface of the photoreceptor drum by two different light emitting sections LD-A and LD-B, and deviation between subsequently written dot images of two line images can be reduced. Consequently, variation in intensity (intensity representation) of an image which is recorded and reproduced on the photoreceptor can closely be reproduced. Especially, such a structure is effective when an image of half tone (photograph) is reproduced.

Figure 6:
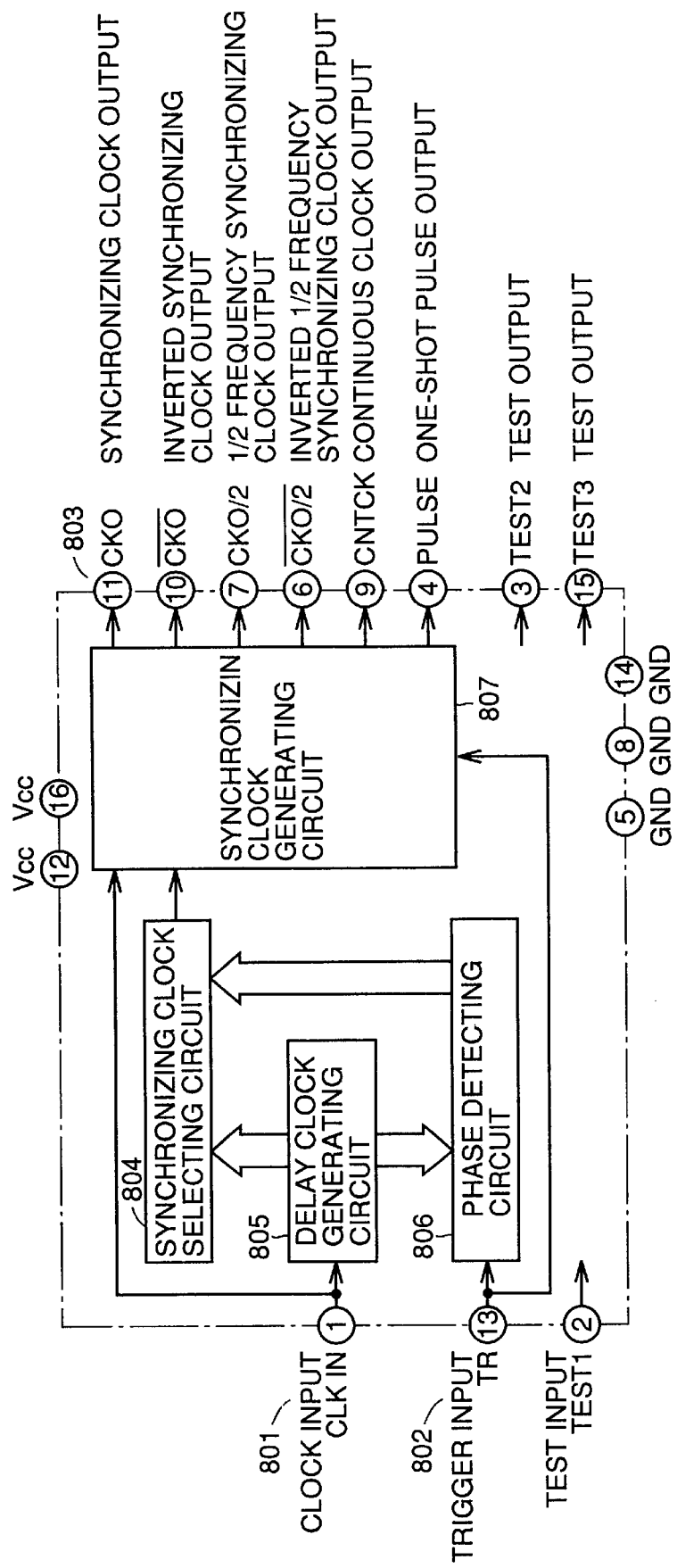
FIG. 6 is a block diagram illustrating a structure of a general-purpose clock generator according to the embodiment of the invention.

Supplementary explanation on a relation between the above-described general-purpose clock generator and the present invention is presented below. Referring to FIG. 6, the general-purpose clock generator is produced through silicon gate CMOS (Complementary Metal Oxide Semiconductor) process, for example, and capable of outputting a clock signal which is input to a clock input (CLK IN) in synchronization with an externally supplied arbitrary trigger input signal (TR). For example, synchronization accuracy (jitter) in the frequency band 25 to 52 MHz is approximately ±3 nS. Some clock generators can supply an inverted output of the above output, a ½ frequency clock output and an inverted one thereof, a one-shot pulse signal, and the like.

The timing at which a synchronizing clock is output is defined by the falling edge of the trigger input signal. The time period from the falling edge to the output of the synchronizing clock corresponds to the sum of "L" pulse width of the clock input signal and IC internal delay, the error of time by the time when the synchronizing clock is output is defined by Δt (e.g. ±3 nS), so that precise synchronization is achieved.

Figure 7:
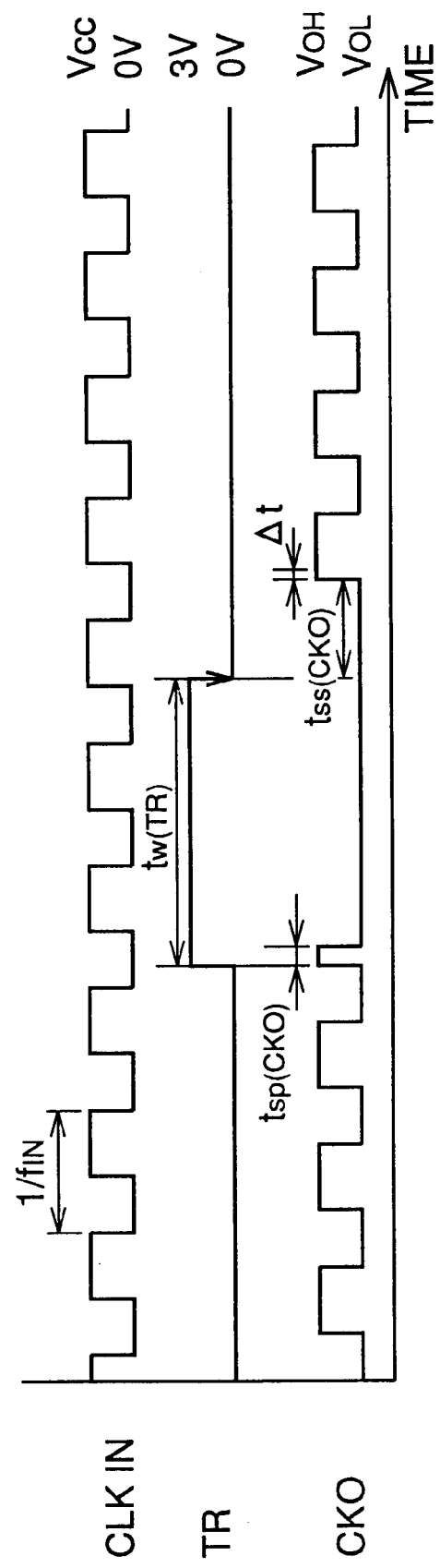
FIG. 7 illustrates a relation between clock input CLK IN, trigger input TR and synchronizing clock output CLO of the general-purpose clock generator shown in FIG. 6.

Referring to FIG. 7, a relation between clock input (CLK IN), trigger signal (TR) and output clock signal (CKO) is now described. In response to the edge falling from TR=H to TR=L (the edge may be rising edge depending on specification), output clock (CK0) having the same frequency as that of input clock (CLK IN) is output after delay time tss (CK0) with error Δt. Delay time tss (CK0) is defined by "L" width of input clock plus α. The value of a is delay within IC. If there is no change in temperature, supply voltage (Vcc) and the like, the values of a and tss are constant. The clock output is stopped during the period in which the trigger input signal is at "H" level, and the synchronizing clock output stays at "H" level for a predetermined time (tsp (CK0)).

Referring to FIG. 6 again, an internal operation of the general-purpose clock generator is described below. A reference clock is supplied from reference clock signal generating unit 700 to a clock input terminal 801. After a delay clock which have a delay relative to the reference clock is generated by a delay clock generating circuit 805, HSYNC signal which is intentionally shifted is supplied to a trigger input terminal 802.

A phase detecting circuit 806 detects the phase of the reference clock. The phase of the reference clock is supplied to a synchronizing clock generating circuit 807 through a synchronizing clock selecting circuit 804. Synchronizing clock generating circuit 807 triggers the reference clock and thereafter outputs a clock of the same period at a predetermined timing from a synchronizing clock out put terminal 803. According to this embodiment, two laser beams can be synchronized by using two general-purpose clock generators (corresponding to image clock signal generating units 701 and 702 in FIG. 4 or those located in block-divided G/A 703). Further, image clock signal generating units 701 and 702 can have almost the same characteristics by integrating corresponding sections (sections related to two lasers) onto one chip. In this case, the scale of the circuit board can be decreased while deterioration in yield could be avoided.

According to this embodiment as described above, digital copying machine 30 includes the reference clock signal generating unit which generates a reference clock signal. Beam detect sensor 465 detects, before scan of the photoreceptor is started, two light beams and outputs light beam detection signals relative to two light beams respectively. Image clock signal generating units 701 and 702 successively generate two image clock signals of the same period based on the two light beam detection signals and the reference clock signal, when respective light beam detection signals are supplied. Scan and recording are performed on the photoreceptor with two light beams in synchronization with the image clock signals. Line images corresponding to two lines which do not deviate from each other can thus be recorded and reproduced with a simple structure. Consequently, an even image with excellent gradations is output.

Image clock signal generating units 701 and 702 respectively generate image clock signals based on one reference clock signal. Two image clock signals are thus generated under the same condition. Accordingly, line images corresponding to two lines with no deviation therebetween can be recorded and reproduced pixel by pixel. An even image having excellent gradations is thus output.

Beam detect sensor 465 outputs two light beam detection signals, and supplies each beam detection signal to corresponding one of two image clock signal generating units 701 and 702. A digital copying machine can accordingly be implemented at a low cost compared with the case in which two beam detect sensors are used. Further, positional adjustment between two beam detect sensors is unnecessary, so that line images of two lines having no deviation from each other are recorded and reproduced pixel by pixel with the highest precision. An even image having excellent gradations is thus output.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus comprising:
    a single reference clock signal generating unit which generates only a single reference clock signal;
    a light beam generating unit which simultaneously generates a plurality of light beams;
    a single beam detect sensor which detects said generated plurality of light beams to output a plurality of light beam detection signals corresponding to said plurality of light beams;
    a plurality of image clock signal generating units connected to said single reference clock signal generating unit and said beam detect sensor, each of said plurality of image clock signal generating units responding to said single reference clock signal and comprising a synchronization clock generating unit for synchronizing said single reference clock signal with a corresponding light beam detection signal to generate an image clock signal of the same period at a predetermined timing, wherein the time period from the falling edge of the light beam detection signal to the output of the image clock signal is corrected to correspond to the sum of pulse width of the reference clock signal and an IC internal delay;
    a modulating unit connected to said image clock signal generating units and responding to said plurality of image clock signals to modulate said plurality of generated light beams based on a plurality of image data;
    a driving circuit connected to said light beam generating unit and said modulating unit and drives said light beam generating unit based on said plurality of modulated light beams;
    a light beam scanning unit which performs periodic scan on a photoreceptor with said plurality of light beams generated by said light beam generating unit; and
    an image recording unit which records an image based on said plurality of light beams with which the scan is performed on said photoreceptor.

2. The image recording apparatus according to claim 1, wherein said beam detect sensor outputs a plurality of light beam detection signals individually.

3. The image recording apparatus according to claim 2, wherein said light beam generating unit includes a plurality of light emitting sections.

4. The image recording apparatus according to claim 3, wherein said modulating unit outputs said plurality of modulated light beams after counting said plurality of image clock signals a predetermined number of times.

5. The image recording apparatus according to claim 2, wherein said modulating unit outputs, after counting said plurality of image clock signals respectively a predetermined number of times, said plurality of modulated light beams.

* * * * *